United States Patent [19]

Bachman et al.

[11] Patent Number: 4,635,809

[45] Date of Patent: Jan. 13, 1987

[54] TELEVISION CABINET HAVING SNAP-TOGETHER ASSEMBLY

[75] Inventors: William J. Bachman, Mt. Laurel; Franklin R. DiMeo, Woodbury, both of N.J.

[73] Assignee: RCA Corporation, Princeton, N.J.

[21] Appl. No.: 799,217

[22] Filed: Nov. 18, 1985

[51] Int. Cl.⁴ .................... A47B 81/06; B65D 6/24; B65D 41/16; H01R 13/44

[52] U.S. Cl. .................... 220/4 B; 220/306; 312/7.1; 312/7.2

[58] Field of Search .............. 220/4 B, 4 E, 306; 312/7.1, 7.2

[56] References Cited

U.S. PATENT DOCUMENTS

| | | |
|---|---|---|
| 618,895 | 2/1899 | Munday . |
| 2,695,723 | 11/1954 | Waterman .................... 220/4 E |
| 3,359,374 | 12/1967 | Joseph .................... 312/7.2 |
| 3,637,246 | 1/1972 | Leiter . |
| 4,004,734 | 1/1977 | Hadtke .................... 220/306 |
| 4,005,367 | 1/1977 | Dano .................... 312/7.1 |
| 4,256,235 | 3/1981 | Klamandt .................... 220/306 |
| 4,411,480 | 10/1983 | Gibson . |
| 4,416,038 | 11/1983 | Morrone, III . |
| 4,471,980 | 9/1984 | Hickman . |

FOREIGN PATENT DOCUMENTS 1457720  9/1966  France .................... 220/4 B

Primary Examiner—George E. Lowrance
Attorney, Agent, or Firm—Paul J. Rasmussen; Eric P. Herrmann; Dilip A. Kulkarni

[57] ABSTRACT

A snap-together latch mechanism for a television cabinet consists of at least one pair of oppositely-disposed, flexible latch fingers secured to the cabinet front and a corresponding number of oppositely-disposed, rigid stops disposed on the back cover. To attach the back cover, it is simply aligned with the cabinet front and inserted to lock it in place.

11 Claims, 4 Drawing Figures

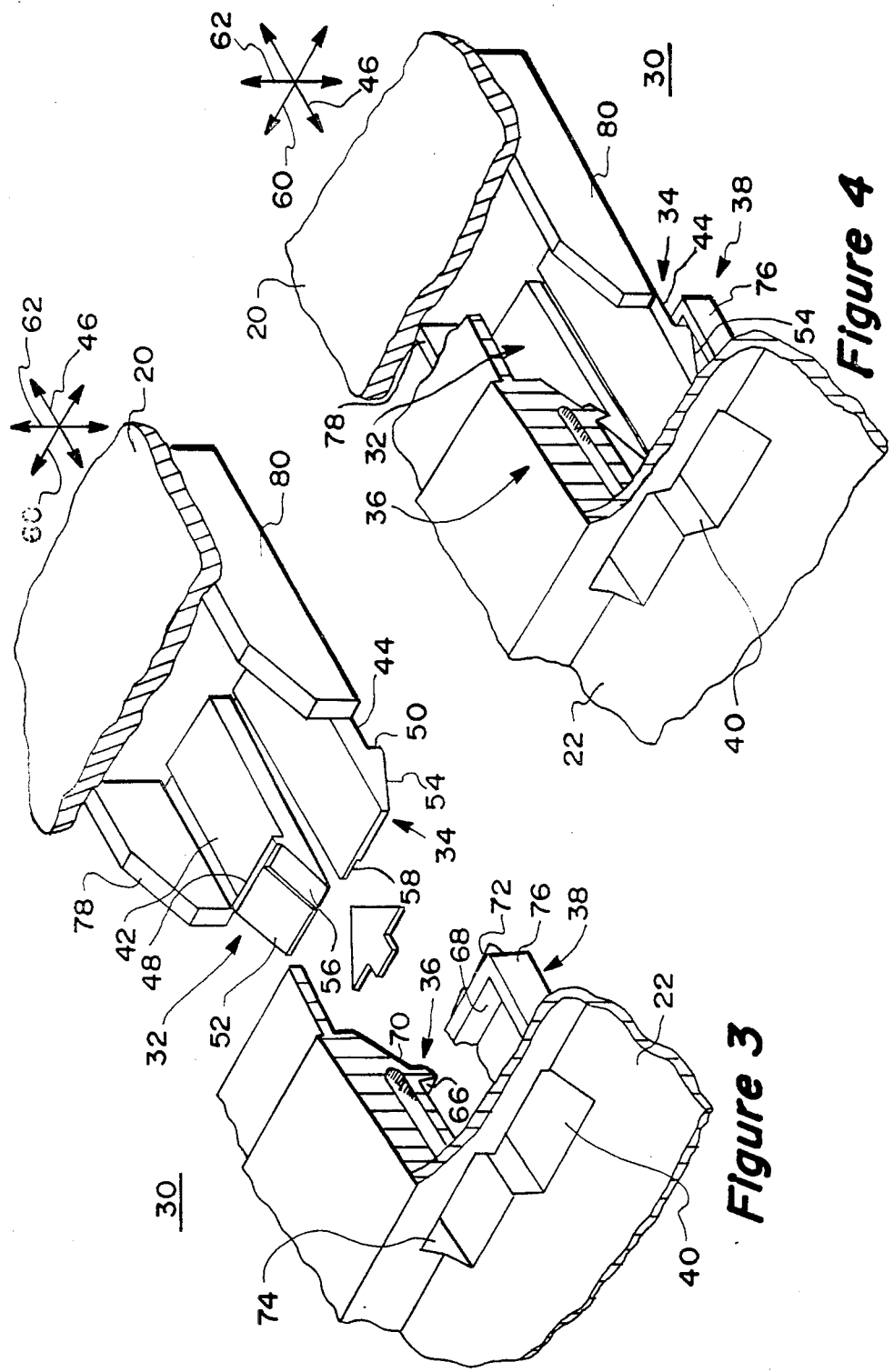

TELEVISION CABINET HAVING SNAP-TOGETHER ASSEMBLY

This invention relates to a snap-type latch mechanism for releasably securing the two halves of a television cabinet.

BACKGROUND

Typically, the cabinet of a portable television receiver is made up of a pair of injection molded halves—the cabinet front and the back cover, which are molded from a suitable thermoplastic material (e.g., polystyrene). The picture tube and the chassis carrying the electronics are mounted to the cabinet front. The back cover is then secured to the front cover to complete the instrument assembly.

The fastening means used for attaching the back cover to the front cabinet must fulfill a number of basic requirements. The fastening means must withstand shock and vibration encountered during handling and shipping. The fastening means must allow disengagement of the back cover from the cabinet front to permit servicing of the television instrument, and it must allow subsequent re-assembly of the back cover. Moreover, the fastening means must not permit inadvertent opening of the back cover to reduce safety hazards.

Traditionally, the television cabinet halves have been joined together with screw type fasteners, since they meet the above-mentioned basic requirements. However, a disadvantage of the screw type fasteners is that they are not amenable to automatic assembly of the television instrument. The assembly time required to install the screws is relatively large. Furthermore, relatively sophisticated equipment is required for automatic installation of the screws.

In the television industry, substantial efforts have been directed toward automation of the instrument assembly line. The pressures for automation have intensified recently due to increased competition. Efforts are under way to design a product that lends itself to automatic assembly. Accordingly, it is desirable to provide a fastening means for joining the back cover to the cabinet front, which not only satisfies the aforesaid basic requirements, but is also conducive to automation (e.g., robotic assembly).

SUMMARY OF THE INVENTION

In accordance with this invention, the cabinet halves are releasably held together by a snap-type latch mechanism instead of screws. The subject latch mechanism consists of at least one pair of oppositely-disposed and relatively flexible latch fingers secured side by side to one of the cabinet halves such that the latch fingers are encompassed within the closure defined by the cabinet halves upon assembly. Each of the latch fingers is provided with a major surface disposed substantially parallel to a path along which the two cabinet halves are inserted into each other to form the cabinet enclosure. Further disposed on each of the latch fingers, toward the free end thereof, is a protruding edge that extends away from the respective one of the major surfaces, and substantially at right angles thereto. The two latch fingers are mounted such that the protruding edges are oppositely disposed with respect to the insertion path.

The subject latch mechanism further includes a corresponding number of oppositely-disposed, relatively rigid stops secured side by side to the other of the cabinet halves such that the stops are also encompassed within the enclosure when the cabinet halves are assembled together. Each of the cabinet halves are equipped with a protruding edge that is disposed substantially perpendicularly to the insertion path. The stops are mounted on the other member such that they engage and displace the flexible latch fingers in opposite directions as the cabinet halves are assembled together until the respective protruding edges of the stops capture the associated protruding edges of the latching fingers to releasably secure the cabinet halves to each other.

The cabinet enclosure is additionally equipped with a window for providing a limited access to the latch fingers when the cabinet halves are assembled to each other. The limited access window is dimensioned such that the entry of human fingers into the window is precluded, while permitting the introduction of a parting tool (e.g., a screwdriver) into the window to cause deflection of the latch fingers in a manner causing disengagement thereof from the stops.

In accordance with a further feature of the subject invention, the latch fingers and stops are integrally molded with the respective ones of the cabinet halves from a suitable, substantially rigid thermoplastic material (e.g., polystyrene).

Pursuant to still another aspect of the invention, the latch fingers and stops are each provided with slanting exterior surfaces to facilitate the assembly of the back cover to the cabinet front.

Although this invention is described in the context of a cabinet for a television receiver, it is equally applicable to the cabinets for other products—such as video display terminals (VDT's), video cassette recorders (VCR's), and so on.

IN THE DRAWINGS

FIGS. 3 and 4 are enlarged perspective views illustrating the suject latch mechanism before and after instrument assembly respectively.

DETAILED DESCRIPTION

Figure 1:
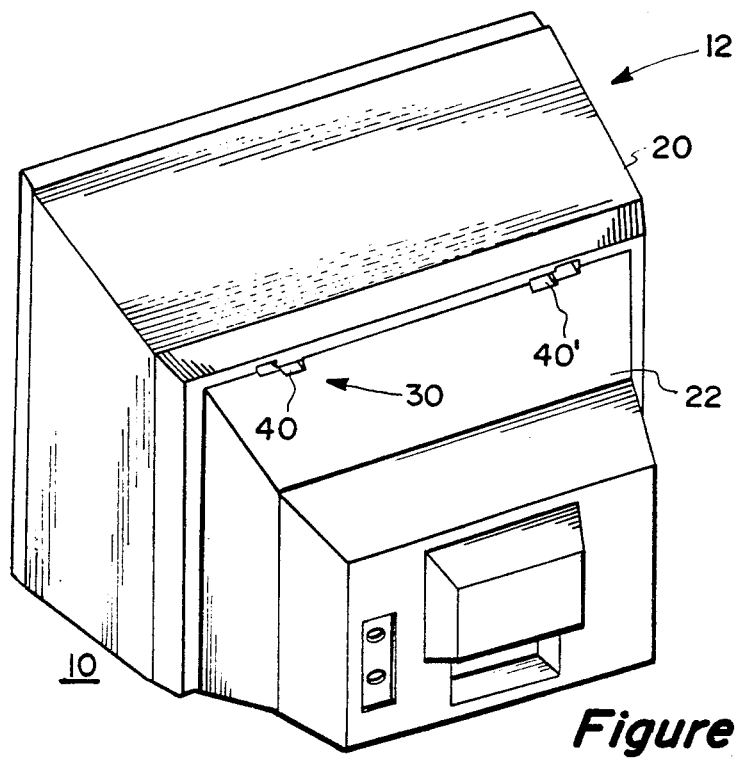
FIG. 1 is a rear perspective view of a television receiver incorporating the snap-together latch mechanism for releasably securing the back cover to the cabinet front in accordance with the subject invention.
Figure 2:
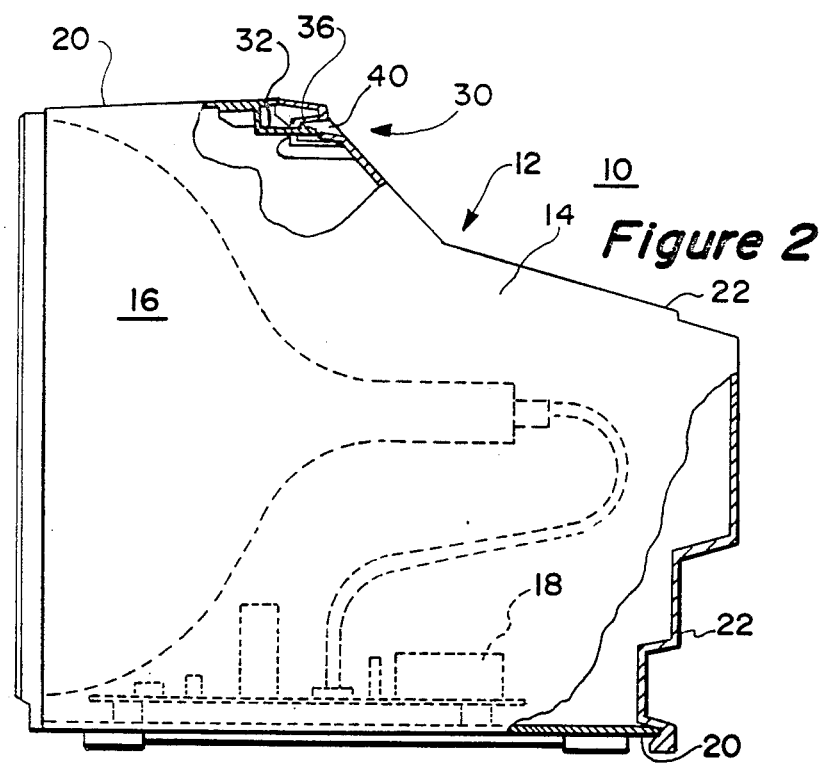
FIG. 2 depicts a partial cross-sectional view of the FIG. 1 television receiver showing the details of the instant latch mechanism.

As shown in FIGS. 1 and 2, a television receiver 10 includes a cabinet 12, which defines an enclosure 14 for housing a picture tube 16 and a chassis 18 of the television receiver. The television cabinet 12 consists of a pair of cabinet halves—the cabinet front 20 and the back cover 22. The picture tube 16 and the chassis 18 are mounted to the cabinet front 20. The back cover 22 is then releasably attached to the front cover 20 by means of a snap-together latch mechanism 30 pursuant to the present invention.

The cabinet front 20 and the back cover 22 are both injection molded from a suitable, substantially rigid thermoplastic material—such as polystyrene, in this particular embodiment of the present invention.

The enlarged perspective views of FIGS. 3 and 4 illustrate the components of the latch mechanism 30. As indicated therein, the latch mechanism 30 includes (1) at least one pair of oppositely-disposed and relatively flexible latch fingers 32 and 34 secured side by side to the cabinet front 20, and (2) a corresponding plurality of oppositely-disposed, relatively rigid stops 36 and 38 mounted side by side on the back cover. Any suitable number of paired latch fingers and stops may be utilized to secure together the cabinet halves. In FIG. 1, two sets of paired latch fingers and stops are indicated for the purposes of illustration.

The latch fingers 32, 34 and the stops 36, 38 are disposed on the respective cabinet halves 20, 22 such that they are totally encompassed within the confines of the cabinet enclosure 14 when the two halves are assembled to each other, as can be seen more clearly in FIG. 2. The latch mechanism 30 further includes a window 40 for providing a limited access to the latch fingers 32 and 34. The limited access window 40 is dimensioned such that, on the one hand, it prohibits entry of human fingers into the window, and, on the other hand, it allows introduction of an implement (e.g., a screwdriver) into the window to permit manipulation of the latch fingers 32 and 34 to disassemble the back cover 22 from the cabinet front 20.

The encompassment of the latch fingers 32, 34 and the stops 36, 38 within the enclosure 14 upon cabinet assembly prevents inadvertent opening of the back cover 22, thereby reducing the safety hazard. At the same time, the access window 40 allows insertion of a screwdriver into the enclosure 14 for releasing the back cover, for example, for the purposes of servicing.

The latch fingers 32 and 34 are each provided with respective major surfaces 42 and 44 which are arranged substantially parallel to a path, indicated by a double-headed arrow 46, along which the two cabinet halves 20 and 22 are inserted into each other to form the cabinet assembly. Further disposed on the latch fingers 32 and 34 are respective protruding edges 48 and 50 which extend away from, and substantially at right angles to, the corresponding major surfaces 42 and 44. At the respective free ends thereof, the protruding edges 48 and 50 are provided with beveled outer surfaces 52 and 54 to facilitate the deflection of the latch fingers 32 and 34 as the back cover 22 is installed to the cabinet front 20.

The latch fingers 32 and 34 are elongated and planar as can be seen in FIGS. 3 and 4. They are secured side by side to the cabinet front 20 at their respective supported ends in a cantilever fashion such that their associated protruding edges 48 and 50 are oppositely disposed with respect to the insertion path 46. This configuration of the latch fingers 32 and 34 allows them to be relatively flexible in the vertical direction 62 perpendicular to the insertion path 46.

The beveled surfaces 52 and 54 of the latch fingers 32 and 34 are provided with recessed areas 56 and 58. The recessed areas 56 and 58 cooperate with each other to form a channel along which a screwdriver can be inserted through the access window 40 for the purposes of disengaging the latch fingers 32 and 34 from the respective stops 36 and 38.

The latch fingers 32 and 34 are offset with respect to each other in the horizontal direction 60 and the vertical direction 62, so that a screwdriver can be simply inserted between the latch fingers and twisted in order ti simultaneously release both the latch fingers from their associated stops 36 and 38.

The stops 36 and 38 are each provided with the respective protruding edges 66 and 68, which are disposed substantially orthogonally with respect to the insertion path 46. Further arranged n the respective protruding edges 66 and 68 are inclined exterior surfaces 70 and 72 along which the associated latch fingers 32 and 34 are guided during assembly of the back cover 22 to the cabinet front 20.

The back cover 22 is equipped with a pair of reinforcing ribs 74 and 76 for the purpose of lending rigidity to the stops 36 and 38. As associated pair of extension members 78 and 80 are provided on the cabinet front 20 for guiding the respective ribs 74 and 76 disposed on the back cover 22 to ensure proper alignment during assembly.

It will be seen from FIGS. 3 and 4 that the oppositely-disposed protruding edges 66 and 68 of the respective stops 36 and 38 are located such that they engage and deflect the corresponding protruding edges 48 and 50 disposed on the respective latch fingers 32 and 34, as the back cover 22 is inserted into the front cabinet 20 during assembly. As the protruding edges 66 and 68 of the stops 36 and 38 clear the corresponding protruding edges 52 and 54 of the latch fingers 32 and 34, the resilient latch fingers snap back to capture the stops to secure the back cover 22 to the cabinet front 20.

The latch fingers 32 and 34 are slightly offset relative to the respective stops 36 and 38 in the vertical direction, so that when the back cover 22 is fully assembled to the cabinet front 20, the latch fingers occupy a slightly deflected position to assure a positive engagement between the latch fingers and the associated stops. The vertical offset between the latch fingers 32 and 34 and the respective stops 36 and 38 is sufficient to maintain good engagement during handling and shipping and to accommodate manufacturing variations.

The inverted relationship between the latch fingers 32, 34 and the stops 36, 38 makes the latch mechanism 30 resistant to shock and vibrations during shipping and handling of the television set 10. The forces that tend to release one of the latch fingers 32 and 34 from its engagement with the associated stop also serve to reinforce the engagement between the other of the latch fingers and the respective stop, thereby preventing accidental opening of the television cabinet 12 due to shock and vibration.

To unlock the back cover 22, a screwdriver is inserted through the access window 40 between the latch fingers 32 and 34. As previously indicated, the channel defined by the recessed areas 56 and 58 guides the insertion of the screw driver. After the screwdriver is sufficiently inserted into the enclosure 14, it is twisted in a manner simultaneously releasing the latch fingers 32 and 34 from the interlocking engagement with the respective stops 36 and 38, whereby the rear cover 22 is freed from the cabinet front 20.

the latch fingers 32, 34 and the stops 36, 38 are preferably integrally molded with the respective cabinet halves 20, 22 from a suitable thermoplastic material. Alternatively, the latch fingers 32, 34 and the stops 36, 38 may be disposed on associated injection-molded bases, and, in turn, glued to the respective ones of the cabinet halves 20, 22.

It will be seen that the snap-together latch mechanism 30 not only meets all the basic requirements mentioned above, but lends itself to robotic assembly of the back cover 22 to the cabinet front 20. To install the back cover 22, a robot simply aligns the back cover 22 with the cabinet front 20, and inserts it to lock it in place. The assembly time required for the snap-together latch mechanism 30 is much less than that required when screws are used to attach the back cover 22.

A further advantage of the subject snap-together latch mechanism 30 is that the latch fingers 32, 34 and the stops 36, 38 can be integrally molded with the respective cabinet members at very little or no extra cost, thereby eliminating the material costs associated with the screws.

What is claimed is:

1. A television cabinet comprising:
   a pair of cabinet halves defining an enclosure when said halves are inserted into each other along a path;
   a pair of oppositely-disposed, relatively flexible latch fingers secured side-by-side to one of said cabinet halves such that said latch fingers are encompassed within said enclosure when said cabinet halves are assembled together; each of said latch fingers having a major surface disposed substantially parallel to said insertion path; each of said latch fingers further having, toward the free end thereof, a protruding edge that extends away from the respective one of said major surfaces and substantially at right angles thereto; said latch fingers being mounted such that said latch fingers are offset with respect to each other in a direction parallel to said major surfaces thereof, and such that said protruding edges are oppositely disposed with respect to said insertion path;
   a pair of oppositely-disposed, relatively rigid stops secured side-by-side to the other of said cabinet halves such that said stops are encompassed within the confines of said enclosure when said cabinet halves are assembled together; each of said stops having a protruding edge which is disposed substantially orthogonally to said insertion path; said stops being mounted on said other member such that they engage and deflect said flexible latch fingers in opposite directions as said cabinet halves are assembled together until said protruding edges of said stops capture the respective ones of said protruding edges of said latch fingers to releasably secure said cabinet halves to each other; and
   said cabinet enclosure being additionally equipped with a window for providing a limited access to said latch fingers when said cabinet halves are assembled to each other; said limited access window being dimensioned such that entry of human fingers into said window is precluded, while allowing introduction of an implement into said window to cause deflection of said latch fingers in opposite directions in a manner causing disengagement thereof from said stops.

2. The cabinet as defined in claim 1 wherein said limited access window is disposed on said other cabinet half provided with said rigid stops.

3. The cabinet as defined in claim 1 wherein said limited access window provides access to said latch fingers in a direction parallel to said insertion path.

4. The cabinet as defined in claim 1 wherein said flexible latch fingers are additionally offset with respect to each other in a direction perpendicular to said major surfaces thereof.

5. The cabinet as defined in claim 1 wherein each of said flexible latch fingers is further provided with a beveled outer surface which extends from said protruding edge thereof to said free end thereof in order to facilitate said deflection of said latch fingers during said assembly.

6. The cabinet as defined in claim 1 wherein said latch fingers are dimensioned such that their free ends extend beyond the respective ones of said protruding edges of said stops in order to further facilitate manipulation of said latch fingers with said implement to cause said disengagement.

7. The cabinet as defined in claim 1 wherein each of said rigid stops is additionally provided with an inclined outer surface extending from said protruding edge thereof to the terminal end thereof in order to facilitate said deflection of said latch fingers during said assembly.

8. The cabinet as defined in claim 1 wherein said cabinet halves are injection molded from a thermoplastic material; wherein said flexible latch fingers are integrally molded with respect to said one cabinet half.

9. The cabinet as defined in claim 1 wherein said flexible latch fingers are disposed on a base, which is glued to said one cabinet half.

10. The display device cabinet as defined in claim 1 wherein said cabinet halves are injection molded from a thermoplastic material; wherein said rigid stops are integrally molded with respect to said other cabinet half.

11. The cabinet as defined in claim 1 further including a second pair of flexible latch fingers and rigid stops having substantially the same configuration as said first mentioned latch fingers and stops; said second pair of latch fingers and stops being secured to the respective ones of said cabinet halves in substantially the same manner as said first mentioned latch fingers and stops; said enclosure being provided with a second limited access window of substantially the same configuration as said first mentioned window.

* * * * *